United States Patent
Beyer

(10) Patent No.: US 6,729,582 B2
(45) Date of Patent: May 4, 2004

(54) METHOD FOR MAKING A SUPPORT BASE PLATE FOR AN ARTIFICIAL SATELLITE ON A DISPENSER PLATFORM FOR A PLURALITY OF SUCH SATELLITES

(75) Inventor: Jean-Claude Beyer, Draveil (FR)

(73) Assignee: Centre National d'Etudes Spatiales, Paris Cedex (FR)

( * ) Notice: Subject to any disclaimer, the term of this patent is extended or adjusted under 35 U.S.C. 154(b) by 0 days.

(21) Appl. No.: 10/203,644

(22) PCT Filed: Feb. 22, 2001

(86) PCT No.: PCT/FR01/00512

§ 371 (c)(1),
(2), (4) Date: Nov. 7, 2002

(87) PCT Pub. No.: WO01/62595

PCT Pub. Date: Aug. 30, 2001

(65) Prior Publication Data

US 2003/0136881 A1 Jul. 24, 2003

(30) Foreign Application Priority Data

Feb. 23, 2000 (FR) .............................. 00 02251
Feb. 23, 2000 (FR) .............................. 00 02250

(51) Int. Cl.[7] .............................................. B64G 1/64
(52) U.S. Cl. ................................. 244/158 R; 244/161
(58) Field of Search ........................... 244/158 R, 161

(56) References Cited

U.S. PATENT DOCUMENTS 3,380,687 A * 4/1968 Wrench et al. ......... 244/158 R
3,907,225 A * 9/1975 Welther .................. 244/158 R
5,199,672 A * 4/1993 King et al. .............. 244/158 R
5,411,226 A * 5/1995 Jones et al. ............. 244/158 R
5,605,308 A * 2/1997 Quan et al. .............. 244/158 R
5,860,624 A * 1/1999 Obry et al. .............. 244/158 R
5,884,866 A   3/1999 Steinmeyer et al. ...... 244/137.1
6,296,206 B1 * 10/2001 Chamness et al. ....... 244/158 R
6,416,018 B2 * 7/2002 DiVerde et al. ......... 244/137.1
6,557,802 B2 * 5/2003 Kroeker .................... 244/161

FOREIGN PATENT DOCUMENTS

DE  42 43 562  6/1994
FR  2 735 099  12/1996
FR  00 02251   8/2001

* cited by examiner

Primary Examiner—Peter M. Poon
Assistant Examiner—Timothy D. Collins
(74) Attorney, Agent, or Firm—Jacobson Holman PLLC

(57) ABSTRACT

A system and method for making a support base plate for an artificial satellite, including a plurality of base plates arranged in a ring on a dispenser platform, each base plate having a cylindrical wall including curved surface elements and substantially planar surface elements. The modular wall elements with curved surface and the wall elements with planar surface are arranged according to a predetermined base plate geometry, and these elements are assembled along their adjacent edges to produce the base plate cylindrical wall.

9 Claims, 2 Drawing Sheets

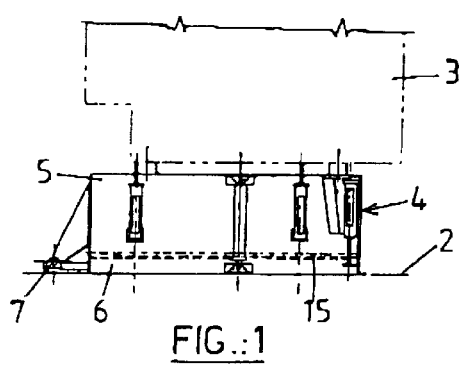
FIG.:1
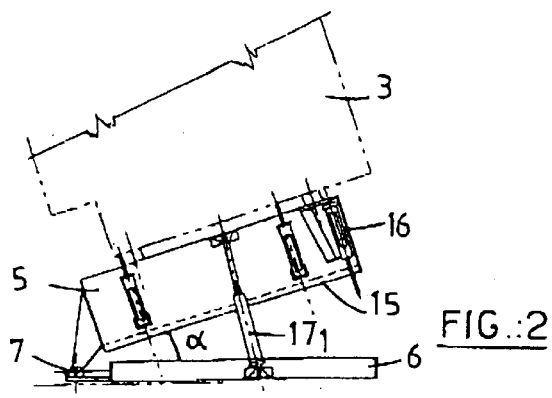
FIG.:2
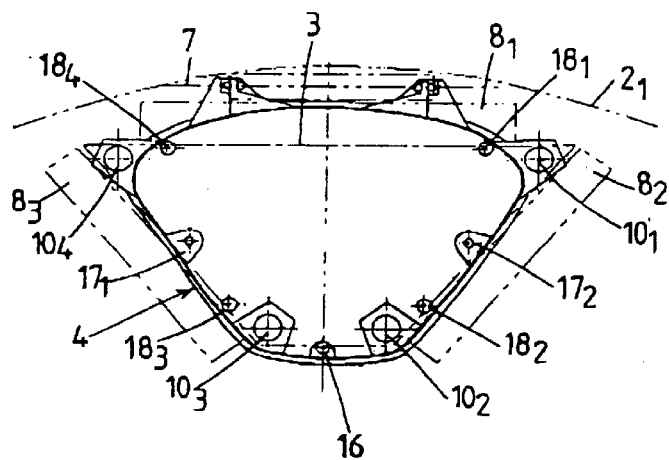
FIG.:3
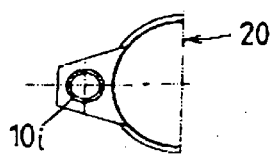
FIG.:4
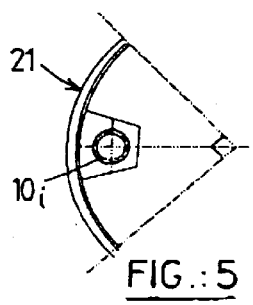
FIG.:5

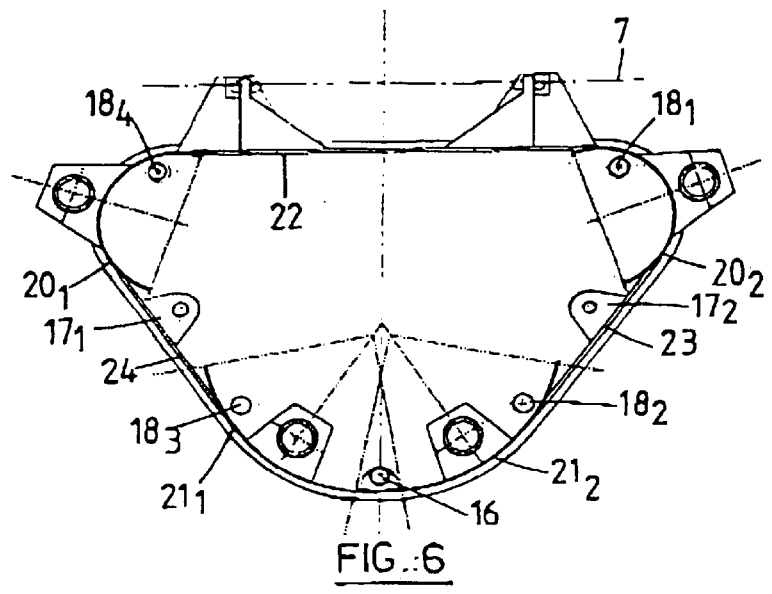
FIG.:6
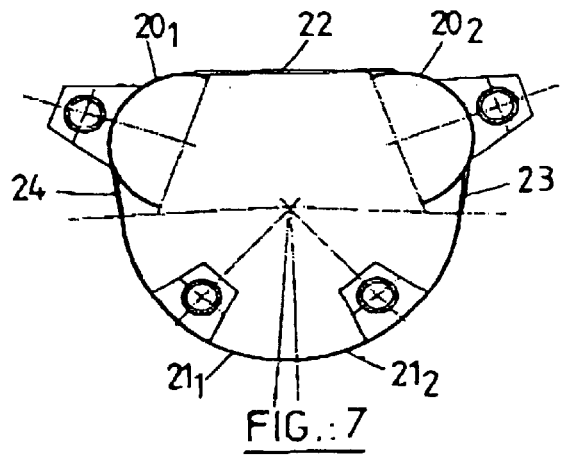
FIG.:7
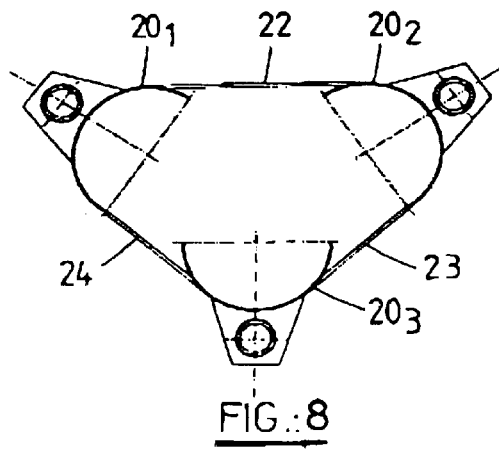
FIG.:8

METHOD FOR MAKING A SUPPORT BASE PLATE FOR AN ARTIFICIAL SATELLITE ON A DISPENSER PLATFORM FOR A PLURALITY OF SUCH SATELLITES

BACKGROUND OF THE INVENTION

1. Field of the Invention

The present invention relates to a method for making a support base plate for an artificial satellite, designed to be mounted on a dispenser platform for a plurality of such satellites, the platform forming part of a launch vehicle for placing said satellites in terrestrial orbit. The invention relates more particularly to a method of the above kind applied to base plates disposed in a ring on the dispensing platform, each base plate having a cylindrical wall comprising curved surface elements and substantially plane surface elements.

2. Description of the Related Art

French patent application N° 00 02251 filed Feb. 23, 2000 by the applicant, whose title translates as "Method of launching a plurality of artificial satellites mounted on the same launch vehicle and device for implementing the method", discloses a method of launching a cluster of satellites designed to form part of a constellation of satellites for communication of digital data, voice or video information, or even multimedia information, for example. The satellites are mounted in a ring around the longitudinal axis of the launch vehicle, on a platform forming part of a dispensing structure. The base of each satellite is fixed temporarily to a trapezoidal base plate whose shape generally conforms to that of the section of the satellite. This shape is chosen because it is easily inscribed within a circular ring element and maximizes the surface area of the section of the satellite and therefore its volume.

In the French patent application previously cited, the base plates are provided with means for tipping them to deploy the "denesting cones" of the satellites before releasing them, to eliminate any risk of collision between the released satellites without requiring sophisticated, and therefore costly, attitude control of the satellites.

French patent application N° 2 735 099 describes a tilting adapter device for dispensing a plurality of payloads on the same launch vehicle, suitable for use as the base plate described above.

Clearly the shape of each base plate depends on the space that is allocated to it on the platform which receives it and therefore on the angle subtended by the circular ring element that it occupies on that surface. This angle is a function of the number of satellites installed on the platform, which number can vary from one launch to another.

Clearly it is therefore necessary to manufacture base plates whose shape is a function of this number, among other things. The manufacture and storage of a wide variety of such base plates, often referred to as "payload adapters", in order to obtain base plates suitable for launching different numbers of satellites, is a long and costly process that does not satisfy current requirements in terms of satellite constellation launches, demanding at one and the same time an increased speed of adaptation of the necessary hardware and a reduction in launch costs.

SUMMARY OF THE INVENTION

One object of the present invention is precisely to provide a method of making support base plates for artificial satellites satisfying both these constraints simultaneously.

The above object of the invention, and others that will become apparent on reading the following description, are met by a method of making a supporting base plate of an artificial satellite, designed to be mounted on a platform for dispensing a plurality of such satellites forming part of a launch vehicle for placing said satellites in terrestrial orbit, the various base plates being disposed in a ring on said dispensing platform, each base plate having a cylindrical wall including curved surface elements and substantially plane surface elements, which method is characterized in that modular wall elements with a curved surface and wall elements with a plane surface are disposed in accordance with a predetermined base plate geometry and said elements are assembled at their adjacent edges to form said cylindrical wall of said base plate.

As described in more detail later, by employing modular elements that can be used in diverse base plate configurations, the above method rationalizes the manufacture of base plates with varied shapes, i.e. reduces the implementation time and cost thereof.

According to other features of the present invention, before disposing said curved surface modular wall elements in accordance with a predetermined base plate geometry, said modular wall elements are trimmed to adapt them to said geometry. Said modular wall elements can be portions of circular cylinders. The base plate geometry is chosen from a plurality of such geometries that can be inscribed within a circular ring element as a function of the geometry and the number of satellites to be mounted on the dispensing structure.

BRIEF DESCRIPTION OF THE DRAWINGS

Other features and advantages of the present invention will become apparent on reading the following description and examining the accompanying drawings, in which:

FIGS. 1 and 2 are diagrammatic views in elevation of a base plate of a type that can be made by the method according to the present invention, showing two different positions of the base plate, FIG. 3 is a diagrammatic plan view of the base plate from FIGS. 1 and 2, FIGS. 4 and 5 are views in cross section of modular wall elements used in the method according to the invention, FIG. 6 is a plan view illustrating the method according to the invention applied to making a base plate of the type shown in FIGS. 1 to 3, and FIGS. 7 and 8 illustrate the making of variants of the base plate shown in FIG. 6 by a method according to the invention.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The structure of a base plate, also known as a payload adapter, of the type with which the present invention is concerned is described briefly with reference to FIG. 1 of the accompanying drawing. For more details of this structure, see the French patent application N° 00 02251 previously cited.

The base plate 4 shown comprises a cylindrical lateral wall which has a generally trapezoidal shape in cross section (see FIG. 3), adapted to support a prism-shaped satellite 3 whose isosceles trapezium shape cross section is shown in chain-dotted line in FIG. 3. The satellite 3 carries in the conventional way solar cell panels $8_1$, $8_2$, $8_3$ and antennas or other units (not shown).

The lateral wall of the base plate 4 is divided into two adjacent portions 5 and 6, one portion (5) receiving the satellite 3 and the other portion (6) constituting a base fixed to a platform (2) of a dispensing structure. A pyrotechnic separator 15 between these two portions is adapted to tear the lateral wall selectively to separate the portions 5 and 6 to enable the top portion 5 to tilt on the base portion 6, tilting the satellite 3 that it carries with it, in accordance with the method of deploying the "denesting cones" of the various satellites carried by the platform 2 described in the French patent applications previously cited. The tilting is made possible by means for articulating the top portion 5 to the base portion 6 about an axis 7. FIG. 2 shows the base plate and the satellite in a predetermined tilted position corresponding to this deployment.

Temporary connecting members $10_1$, $10_2$, $10_3$, $10_4$ are disposed at the corners of the trapezium shape cross section of the top portion 5 to receive the satellite 3, as shown in FIG. 3. This top portion also receives an impulse actuator 16 for applying a tilting force to the top portion 5 after the lateral wall of the base plate 4 is torn, non-return actuators $17_1$, $17_2$ for locking the top portion 5 in a predetermined tilting angular position, and four spring members $18_1$, $18_4$ for applying an axial impulse to the satellite 3 after operation of the pyrotechnic separator 15 and the impulse actuator 16 and deactivation of the connecting members $10_i$, this axial impulse separating the satellite from the launch vehicle.

The members $10_1$, 15, 16, $17_1$, $17_2$ and $18_i$ are standard members that can be used on base plates with different geometries. To rationalize the fabrication of these base plates even further, in accordance with the aim of the present invention, the emphasis is therefore on the fabrication of the lateral wall of the base plate, whose shape depends closely on that of the circular ring element within which it must be inscribed on the platform 2.

In accordance with the present invention, to transfer forces between the satellite 3 and the platform 2 without deformation, this convex wall is subdivided into curved surface wall elements and plane or substantially plane surface wall elements, and the wall is fabricated by assembling such elements. This method is shown in FIGS. 4 to 6, of which FIGS. 4 and 5 represent two curved surface modular wall elements 20 and 21 and FIG. 6 shows an assembly of such elements with flat wall elements 22, 23 and 24.

FIG. 4 shows by way of illustrative and non-limiting example only, a modular wall element 20 having a circular semicylindrical surface and FIG. 5 shows a modular wall element 21 having a circular cylindrical surface subtending an angle at the center of 90°. Each carries a connecting member $10_i$ which can be seen in FIG. 6, which member is fixed either to the convex portion of the element 20 or into the concavity of the element 21.

As shown in FIG. 6, by placing two elements $20_1$, $20_2$ at the ends of the longer side of a trapezoidal shape and two elements $21_1$, $21_2$ at the ends of the short side of that shape, and by connecting those elements either to each other (elements $21_1$ and $21_2$) or by means of plane elements 22, 23, 24, a base plate wall can be constituted that substantially conforms to that of the base plate shown in FIG. 3.

It is obviously necessary, before assembling these elements, for example by welding them together, to trim them so that they join edge-to-edge and tangentially, in accordance with various base plate geometries suitable for launching clusters of satellites in different numbers and/or with different shapes.

FIGS. 7 and 8 show by way of illustrative and non-limiting example only, two other base plate wall geometries that can be obtained using the wall elements described above, these geometries being chosen from a large number of geometries that can be obtained using a method according to the invention. Thus the section of the FIG. 7 base plate wall tends toward a circular shape through reducing the length of the plane wall section 22 of the FIG. 6 wall, whereas that of the FIG. 8 wall tends toward a triangular shape, based on the use of three elements $20_1$, $20_2$, $20_3$, of the type shown in FIG. 4.

It is now clear that the method according to the invention produces base plate walls of very varied shape, adapting to a wide variety of satellite cluster configurations, based on a small number of modular wall elements with curved surfaces that can be used regardless of the geometry of the base plates to be produced. This reduces the cost of storing these elements whilst ensuring that they are immediately available. Storing the plane wall elements is a simple matter because these elements can be cut on demand from standard flat plate. Like the plane elements, the curved surface wall elements can have dimensions suited to the greatest load, so that they can be used without further design input. The curved surface modular elements 20, 21, which are placed in the corners of the section of the wall of the base plate, are advantageously pre-equipped with the portion of the connecting members $10_i$ of the base plate and of the satellite that they carry, before the modular elements are put into stock.

All these features confer upon the method in accordance with the invention of making base plates remarkable performance in terms of easy and fast adaptation and the cost of making the base plates. After mass production of base plate walls suitable for a particular geometry of the structure for dispensing a cluster of satellites, the base plates are completed by equipping them with the tilting means 7, 15, 16, $17_1$, $17_2$ and the means $18_i$ for separating each satellite described above. When installing the satellite 3 on the base 4 assigned to it, the temporary connecting members $10_i$ described in more detail in the French patent application previously cited are placed between them.

Of course, the invention is not limited to the embodiments described and shown, which are offered by way of example only. Thus replacing one or more of the plane wall elements 22, 23, 24 of the embodiment shown in FIGS. 6 to 8 with equivalent wall elements, for example flat and slightly curved elements, would not depart from the scope of the invention.

What is claimed is:

1. A method of making various supporting base plates of an artificial satellite, each base plate designed to be mounted on a platform for dispensing a plurality of such satellites forming part of a launch vehicle for placing said satellites in terrestrial orbit, the various base plates being disposed in a ring element on said dispensing platform, each base plate having a generally cylindrical lateral wall, the method comprising the steps of:

preparing a plurality of modular wall elements including a first set of individual modular wall elements each having a curved surface, and a second set of individual modular wall elements each having a planar surface, said first and second sets of elements being variably connectable so as to be useable in diverse base plate configurations regardless of a geometry of the base plate to be made;

determining a shape of said lateral wall according to said ring element within which said wall is to be inscribed on said platform to determine a base plate geometry;

arranging at least some of said plurality of modular wall elements in accordance with said base plate geometry; and connecting said elements at their adjacent edges to form said generally cylindrical lateral wall of said base plate from the connected modular wall elements.

2. The method according to claim 1 wherein, before arranging said curved surface modular wall elements in accordance with said predetermined base plate geometry, said modular wall elements are trimmed to adapt them to said geometry.

3. The method according to claim 1, wherein said modular wall elements are portions of circular cylinders.

4. The method according to claim 1, wherein said base plate geometry is chosen from a plurality of such geometries that can be inscribed within a circular ring element as a function of the geometry and the number of satellites to be mounted on said dispensing platform.

5. The method according to claim 1, wherein said modular wall elements carry means for establishing a temporary connection between the base plate and the satellite to be supported thereon.

6. The method according to claim 5 wherein, after assembling said elements of the lateral wall of the base plate, there are installed thereon a mechanism for selectively tilting a top portion of said base plate relative to a base portion of said base plate before launching into orbit the satellite carried by said base, and means for separating the satellite after deactivation of the temporary connecting means.

7. The method according to claim 6, wherein said tilting mechanism include means for articulating said top portion on an axis and a pyrotechnic separator mounted on said lateral wall of the base plate so that it tears said wall selectively along a line separating said top portion from said base portion.

8. The method according to claim 1, wherein said step of connecting includes welding said elements at their adjacent edges.

9. A method of making various supporting base plates of an artificial satellite, designed to be mounted on a platform for dispensing a plurality of such satellites forming part of a launch vehicle for placing said satellites in terrestrial orbit, the various base plates being disposed in a ring on said dispensing platform, each base plate having a generally cylindrical wall including curved surface elements and substantially planar surface elements, the method comprising the steps of:

disposing modular wall elements with a curved surface and modular wall elements with a plane surface in accordance with a predetermined base plate geometry;

connecting said elements at their adjacent edges to form said generally cylindrical wall of said base plate from the connected modular wall elements;

installing on said wall a tilting mechanism for tilting a top portion of said base plate relative to a base portion thereof before launching into orbit a satellite carried by said base plate; and mounting on said lateral wall a pyrotechnic separator to tear said wall along a line separating said top portion from said base portion.

* * * * *